United States Patent [19]

Lima

[11] Patent Number: 5,406,491

[45] Date of Patent: Apr. 11, 1995

[54] NAVIGATIONAL SYSTEM FOR TRIP ROUTING

[75] Inventor: David J. Lima, Los Altos, Calif.

[73] Assignee: Trimble Navigation Limited, Sunnyvale, Calif.

[21] Appl. No.: 37,340

[22] Filed: Mar. 26, 1993

[51] Int. Cl.⁶ ............................................. G06F 15/50
[52] U.S. Cl. .................................... 364/449; 364/444; 342/457; 340/990; 340/995
[58] Field of Search ................. 364/443, 444, 449; 73/178 R; 340/988, 990, 995; 342/357, 457

[56] References Cited

U.S. PATENT DOCUMENTS

| | | | |
|---|---|---|---|
| 4,774,671 | 9/1988 | Itoh et al. | 340/995 |
| 4,812,845 | 3/1989 | Yamada et al. | 364/449 |
| 4,882,696 | 11/1989 | Nimura et al. | 364/449 |
| 4,888,699 | 12/1989 | Knoll et al. | 340/995 |
| 4,937,751 | 6/1990 | Nimura et al. | 364/449 |
| 5,014,206 | 5/1991 | Scribner et al. | 364/443 |
| 5,031,104 | 7/1991 | Ikeda et al. | 364/449 |
| 5,043,902 | 8/1991 | Yokoyama et al. | 340/995 |
| 5,067,082 | 11/1991 | Nimura et al. | 340/995 |
| 5,084,822 | 1/1992 | Hayami | 340/995 |
| 5,177,685 | 1/1993 | Davis et al. | 364/443 |

*Primary Examiner*—Gary Chin
*Attorney, Agent, or Firm*—John Schipper

[57] ABSTRACT

Method and apparatus for indicating and allowing a traveler to follow a chosen route from an origin point to a destination point on the Earth's surface, using a portable Satellite Positioning System and audible or visual information presentation means. Initially, the traveler positions a map or chart with the intended route thereon on a light-sensitive table and traces each segment of the route with a pressure-sensitive light pen. Information on each segment and the locations of its endpoints is entered in a microprocessor. Coded information shown on the map itself is entered into the microprocessor, using a bar code reader or similar device. Along the route, the traveler carries the microprocessor and a portable Satellite Positioning System (SPS) antenna and receiver/processor, connected to the microprocessor. As the traveler approaches each turn point or decision point in the route, determined by a common endpoint of two consecutive segments, the apparatus advises the traveler audibly or visually that the decision point is near and of the initial direction of the next consecutive segment. The traveler is also advised if the actual route deviates significantly from the chosen route and of the appropriate corrective action to be taken to reduce the deviation. Optionally, the apparatus can include information on one or more alternative routes that can be used if a portion of the chosen route is impassable or otherwise unavailable. This approach is of special usefulness to a visually impaired or visually preoccupied traveler. The SPS may incorporate differential positioning to improve the accuracy of the SPS-determined location.

29 Claims, 2 Drawing Sheets

NAVIGATIONAL SYSTEM FOR TRIP ROUTING

FIELD OF THE INVENTION

This invention relates to mapping or charting of a trip route, using a Satellite Positioning System (SATPS) for location of decision points along the route.

BACKGROUND OF THE INVENTION

One welt known method of planning a trip using a given route is to mark the route on a paper map or chart and then refer to the marked route whenever a route decision point is reached. This approach assumes that the traveler is using a well marked route, among a network of such routes, that is easily visually perceived. If the route is not part of an easily perceived network, or if the traveler is visually impaired or unfamiliar with the region, a route marked on a paper map or chart may be of little use.

Several patents disclose portable navigation devices for walkers that combine pedometers and direction finders. One such navigation device is disclosed in U.S. Pat. No. 3,355,942, issued to Freeman, for a fully mechanical stride measuring device that relies upon air pressure variations sensed in a bellows carried in one or both heels of the walker's shoes. As the journey progresses, each step (or every other step) of the walker produces an compression/expansion cycle in the bellows, and the number of such cycles is accumulated to determine total distance travelled, based upon an average length stride for that walker. The direction finder determines the present bearing of the walker and expresses each stride in terms of north, east, south and west components. The path followed by the walker and the walker's present position relative to his/her path origin are thus determined.

Another portable navigation device is disclosed by Hoff in U.S. Pat. No. 3,710,083. Present direction of travel is determined by an electronic compass that generates voltages proportional to the horizontal and vertical components of the Earth's local magnetic field. The output signal is processed further and multiplied by a voltage signal representing the distance travelled by the walker at each stride to determine the north, east, south and west components of each stride of the walker. The local directions for magnetic north and true north are reconciled with each other. A distance measuring device for each stride is introduced but not discussed in detail.

U.S. Pat. No. 4,220,996, issued to Searcy, discloses a portable distance computer to be worn by a walker or runner. Path direction is not determined; only the total distance travelled is determined. The device displays the pre-selected number of strides to be taken per unit time interval and provides an audible tone for each stride to be taken at that stride rate. A visual stride cue, such as a blinking LED, can also be provided. The device also displays the present time or elapsed time and the number of minutes per mile, computed using an adjustable stride length. Another electronic pedometer that computes and displays distance travelled, time per unit distance, elapsed time and time of day is disclosed by Karr et. al. in U.S. Pat. No. 4,371,945.

Elbaum et. al. disclose a curve follower that uses a a grid of intersecting lines in U.S. Pat. No. 4,319,331. Coordinates of the curve where the curve crosses a given line or set of lines are recorded and used to quantize the curve into a sequence of line segments. The grid may be two- or three-dimensional. The curve to be followed or described may be set down on a plane, on a two-dimensional surface, or in a space frame. Endpoints of a curve possess special characteristics that allow identification as such.

Tanaka et. al., in U.S. Pat. No. 4,608,656, disclose a road map display system that indicates the position of a selected vehicle. The system includes a plurality of scalable maps of adjacent regions and means for choosing a particular scale factor for the map displayed, especially where the vehicle approaches an intersection or possible decision point in the path followed. A map is displayed with an icon representing the vehicle, and the vehicle is displaced from its starting point as the vehicle journey proceeds.

Another scalable map display system for a vehicle is disclosed in U.S. Pat. No. 4,675,676, issued to Takanabe et. al. A map showing the present vehicle location can be scaled automatically as the vehicle approaches the specified destination; or the displayed map can be scaled by a user-selected factor.

In U.S. Pat. No. 4,821,192, Taivalkoski et. al. disclose a map system for a moving robot, defined by a sequence of nodes that determine the path to be followed by the robot. The distance the robot has travelled along the selected path is measured at certain intervals. The final node representing the end of the selected path has a beacon that radiates a signal perceptible by the moving robot. The robot learns the selected path as an ordered sequence of path segments having direction and length in that direction. The system can also monitor the robot's orientation along the selected path. The robot apparently halts when it reaches the beacon. The path to be followed by the robot can be internalized or stored in memory by the robot, as a sequence of path segments having both length and direction.

Baird, in U.S. Pat. No. 4,939,663, discloses use of a topographical map for navigational correction of the computed flight path of an aircraft. A topographical map of the surface along the intended flight path, including a grid of elevations, is stored in a computer. A sequence of altimeter readings taken during the flight are compared with the estimated aircraft flight path, and corrections are determined based upon the most probable aircraft position consistent with each altimeter reading.

A map display for a moving vehicle is disclosed by Nagashima in U.S. Pat. No. 4,970,682. A distance sensor and a direction sensor estimate the distance and direction travelled and relate these to a road map or path stored in a computer, using pattern recognition techniques. An icon representing the vehicle's estimated present position along the selected path is displayed from time to time.

U.S. Pat. No. 4,991,126, issued to Reiter, discloses a portable, automatic orientation device for walkers, runners and horseback riders and for the blind. A stride motion pulse generator senses each step taken by the walker, runner or rider and, using an average distance for each such step, accumulates the number of steps taken and the distance travelled since the wearer of the device left the "origin". A local magnetic field sensor determines the direction taken for each step and determines the two-dimensional vector representing that step in a local tangent plane on the Earth's surface. The particular path taken from origin to destination is stored and can be retraced by the device wearer, using a visual or auditory readout from the device to stay near or on the path originally taken. The device does not use a map or accept entry of path information from a map and does not provide information on the wearer's present location as the journey progresses. The device is small and can be worn around the waist or around the neck of the user.

Schneyderberg Van Der Zon, in U.S. Pat. No. 4,996,645, discloses a map display system in which road map data are stored and selectively displayed, together with a name representing the local area, for vehicle navigation. A portion or all of the road map data for a local area can be displayed. The system includes a vehicle direction indicator and a distance travelled indicator so that the local area including the present location of the vehicle can be automatically called up and displayed. The map detail representing the local area can be displayed in different colors. The origin and destination of a trip are entered by a keyboard included in the system. The keyboard can also be used to request display of a specified local area.

Control of a route taken and operations performed by a wandering robot, using electronic chip cards loaded into the robot's memory, is disclosed by Gloton in U.S. Pat. No. 5,031,109. With one or more such cards loaded into the robot's memory, the robot follows a path prescribed by the card(s) and performs operations prescribed by the card(s) at specified locations along the route. The route taken and the operations performed can be changed by changing the cards loaded into the robot's memory.

A navigation system for land vehicles, using stored road map data, is disclosed in U.S. Pat. No. 5,122,961, issued to Toyama et. al. The system includes a direction sensor and a distance travelled sensor to determine and display the present location of a vehicle along a selected route. Using the selected route and road constraints set down in the stored road map data, the present vehicle location is computed and displayed. Two spaced apart photosensors that also emit light are directed at the road passing beneath the moving vehicle and are used to detect or check actual vehicle speed.

The above-described approaches do not provide the accuracy needed for a route that is not part of a network of easily perceived routes, do not provide automatic prompting as a traveler approaches a route decision point, and/or or not portable. What is needed is a portable mapping or charting system that: (1) allows use of any two-dimensional map or chart for planning the chosen route, including commercial maps and reproductions thereof and electronically displayed maps; (2) provides information on a chosen route that is accurate to within a few meters; (3) provides automatic visual or audible prompting of the traveler as a decision point in the chosen route is approached; (4) can be used where the chosen route is part of a network of easily perceived routes or in a region (i.e., the wilderness) where the route is not so perceivable; (5) allows change of a route to a chosen alternative route if some portion of the original route is impassible or otherwise unavailable; (6) provides audible and/or visual prompting as the traveler's deviation from from the chosen route becomes significant and indicates the direction and distance required to return to the chosen route; and (7) allows use of bar code or other suitable means for entry of information to fix the map scale and relevant details in the system's frame of reference.

SUMMARY OF THE INVENTION

These needs are met by the invention, which provides an approach for charting or mapping a chosen route, and one or more alternative routes if desired, using location information provided by a Satellite Positioning System (SPS), such as the Global Positioning System (GPS) or the Global Orbiting Navigation Satellite System (GLONASS). The traveler first uses a light pen, having either a pressure sensitive point or a button to serve as a switch, to indicate the origin and destination for the chosen route and to trace the desired route on a scaled map. This information is entered into and stored in memory by a microprocessor. The traveler carries a portable SATPS antenna and receiver/processor that determines the traveler's present location and (optionally) the present time, using SATPS signals received from two or more SPS satellites. As the traveler approaches each turn point or other decision point in the chosen route, the traveler is advised, audibly or by a visual display, that a decision point is near. The traveler is thus prompted at each decision point along the route so that the traveler can prepare to stop, turn, reduce speed or determine what action to take at the decision point. Optionally, the traveler can be advised continually or intermittently of the traveler's deviation from the chosen route. This prompting can be audible (e.g., by provision of a voice announcement "Go left ten meters") or visual (e.g., by a blinking icon or other visually distinguishable symbol on an electronic display that indicates that the traveler should move northwest by ten meters).

Optionally, information on alterative routes or route branches can be entered and stored in the microprocessor, to be used if some portion of the chosen route is impassible or otherwise unavailable. Optionally, the apparatus carried by the traveler also includes a transmitter or transceiver so that the traveler's present location can be reported periodically and/or the traveler can receive messages as well as information on route detours to be taken, inclement weather in the region, or other relevant information. If the SATPS uses differential positioning for purposes of location, the traveler can also receive differential position corrections from a reference SATPS receiver-transmitter.

The invention allows use of any visually perceptible map to plan a route or trip to be followed by a vehicle or individual on foot. The invention optionally provides a visual or audible readout that prompts the traveler as a decision point or other similar point is approached in the route. This allows a person whose vision is impaired or whose eyes are focused on other matters to follow the planned route with little or no navigation difficulty.

DESCRIPTION OF BEST MODE OF THE INVENTION

Figure 1:
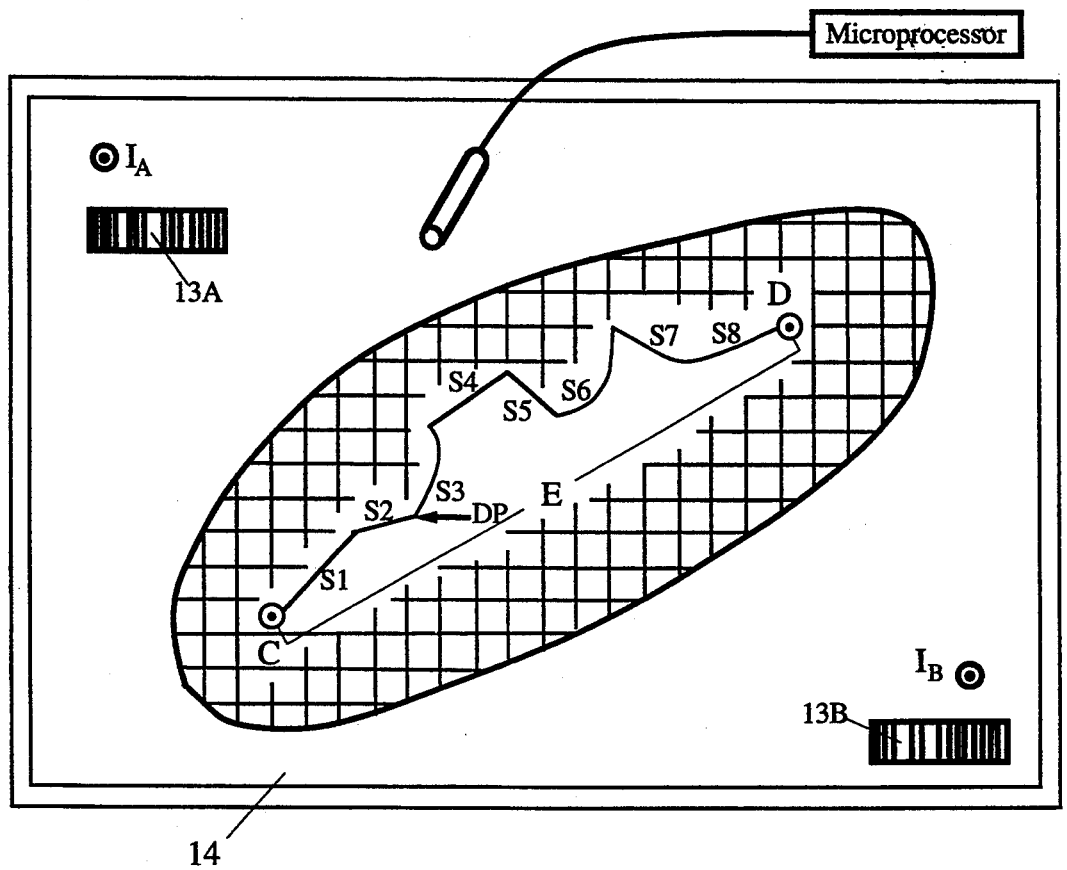
FIG. 1 is a schematic view of a map and associated apparatus useful for entering route information according to an embodiment of the invention.

The invention includes one or more maps or charts of local regions on the Earth's surface, each map having two or more location fix indicators and associated bar codes that provide machine-readable location information for a particular location indicator. With reference to FIG. 1, a map 11 of a local region is provided with a first location indicator $I_A$ and a second location indicator $I_B$ and associated bar code strips 13A and 13B, respectively, spaced apart from each other on the map. A traveler wishing to plan a travel route between any two locations in this local region R first fixes or immobilizes the map 11 under a transparent display 14. Optionally, a backlight 15 can trans-illuminate a transparent map 11. The traveler then "enters" the location A by (1) reading in the bar code information from strip 13 A, using a bar code reader 17, and (2A) entering location A by pressing a light pen 19 at the location $I_A$ shown on the map or (2B) following screen-displayed instructions to enter information on map scale, region identification and other relevant details on the local region R (hereinafter referred to as the "frame of reference" of the region R). The location B is entered by a similar procedure. Optionally, the bar code reader 17 and light pen 19 may be combined in one instrument.

The bar code strips 13A and 13B may contain machine-readable information describing the locations A and B in an appropriate coordinate system, some information on the scale used for the map 11, and possibly some topographical information on the local region. The particular distinct locations A and B may be set down anywhere on the map 11, but it is preferable for locations A and B to be set down near opposite corners of the map 11, to minimize inaccuracies in entering the relevant map data. The location of the indicators $I_A$ and $I_B$ and scale and topographical information are received from the bar code reader 17 and light pen 19 by a microprocessor 21, which then fixes the region R in the system's frame of reference. Alternatively, the bar code reader can be used to enter supplemental information from pre-printed menues, such as survey data, local campgrounds, comfort stations, supply stores, gasoline stations in, and police reports on, the region R.

Assume that a traveler wishes to proceed from location C to location D on the map by a route E that includes a connected sequence of several segments $\{S_i\}$ (i=1, 2, ... ), each segment being linear or curvilinear and having a turn or other decision point at one or both ends of each segment $S_i$, as illustrated in FIG. 1. The collection of segments $S_i$ together determine the route E. The traveler first enters the bar coded scale and frame of reference data for the map of the region R into the microprocessor 21. The traveler then activates the light pen 19, positions the active or indicator point of the light pen at the origin location C, and traces the route E along the map 11 segment-by-segment, preferably without lifting the pen from the map if one or more segments are curvilinear, until the pen reaches the destination location D. Two consecutive route segments will have a common endpoint that serves as a turn point or decision point DP for the route E. If all segments are linear, the traveler can enter the origin, destination and intermediate decision points DP separately, and the microprocessor 21 can linearly interpolate between these segment endpoints.

As the pen 19 traces or otherwise defines each segment or segment endpoint, this information is received by the microprocessor 21 and convened to coordinate information, based upon the scale and frame of reference information for the map 11 entered initially. Optionally, the traveler can also indicate a decision point DP on the route E by pressing the pen 19 onto the map 11 at that point, or by pressing a button on the light pen with the pen point contacting the decision point DP, and the system will note and record this decision point. This information is automatically entered into the microprocessor 21, which determines the location in an appropriate coordinate system of each such decision point DP on the map 11 and the direction/angle of a turn or other action to be taken at that point. The traveler subsequently begins the journey along the route E, starting at the point C or at any other point on the route that can be indicated for the microprocessor 21.

Figure 2:
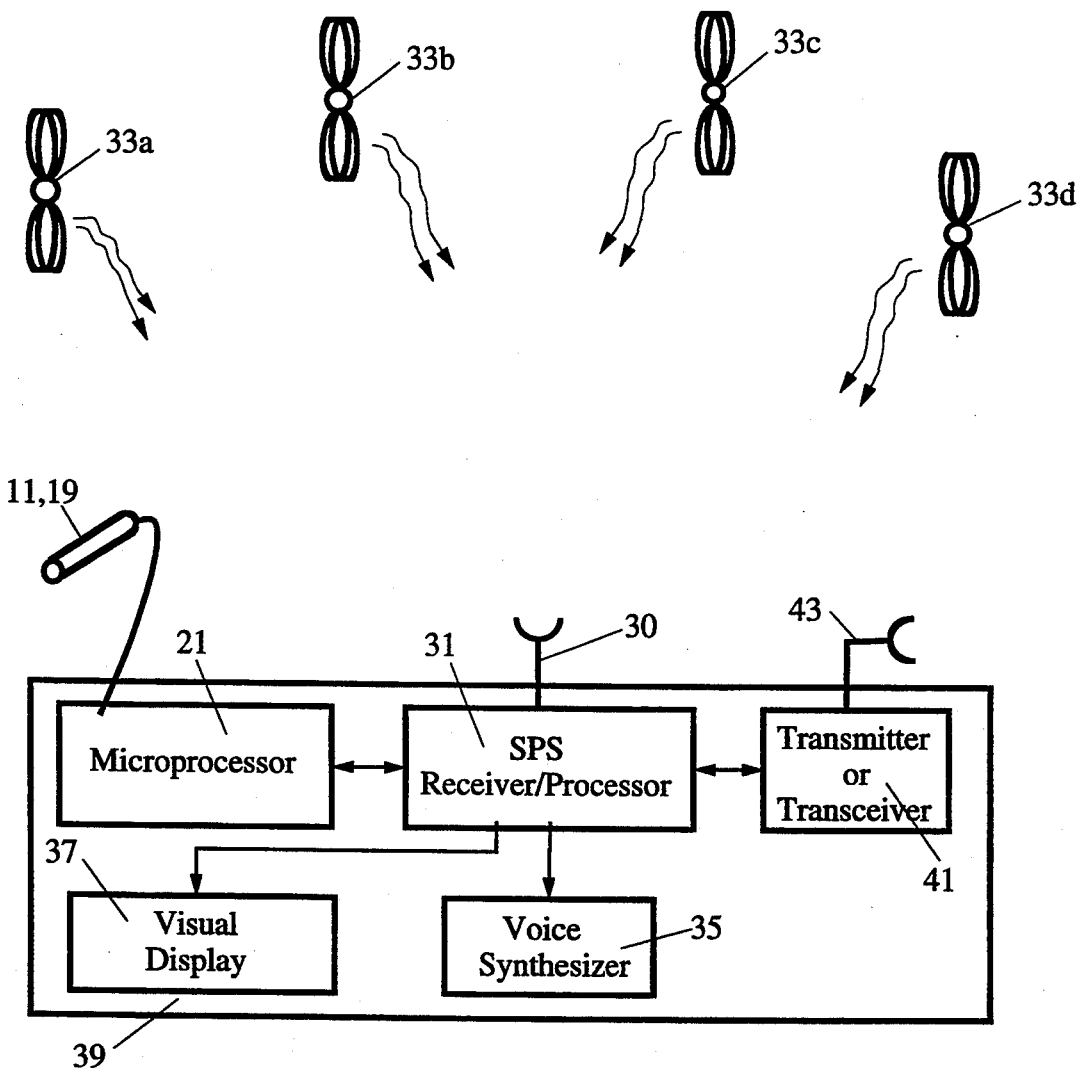
FIG. 2 is a schematic view of apparatus useful for receiving and analyzing route and present location information according to the invention.

The traveler carries a portable SATPS signal antenna 30 and receiver/processor 31, illustrated in FIG. 2 (not drawn to scale), that receives GPS signals from two or more SATPS satellites 33a, 33b, 33c and 33d and that provides information on the present location of the SATPS signal antenna carried by the traveler. The microprocessor 21 is connected to, or may be part of, the SATPS receiver/processor 31 and receives this present location information for the traveler as the traveler proceeds along each segment $S_i$ of the route E. As the traveler nears the end of each segment $S_i$, within a specified distance, such as 1320 feet or 100 feet, from the end of the segment, the SATPS receiver/processor 31 senses this and causes a voice synthesizer or other audible information presentation means 35 (optional), controlled by the SATPS receiver/processor 31, to announce that the traveler will reach the end of such segment after a specified distance (and, optionally, at an estimated time) and will then take a turn, jog or other some action, in the direction described by the initial pan of the segment $S_{i+1}$ defined by the light pen 19 on the map 11. This information may include the present bearing, present velocity, new bearing or direction at the turn point being approached, any decision to be made at the turn point, and status of information now being received by the SATPS receiver/processor 31 from the SATPS satellites 33a, 33b, 33c and 33d. This audible information is optionally repeated, with appropriate modification, at one or more points closer to the end of the segment and/or at the end of the segment $S_i$.

Alternatively or additionally, a portion or all of this end-of-the-segment information may be displayed on a visual display 37 (e.g., on a map display or as a visual display carried by the traveler and linked to the microprocessor 21) on the SATPS receiver/processor 31. The map of the local region R presented on the visual display 37 can optionally be magnified or scaled as the traveler approaches a decision point DP, to provide easier visual perception of the area near that decision point.

Figure 3:
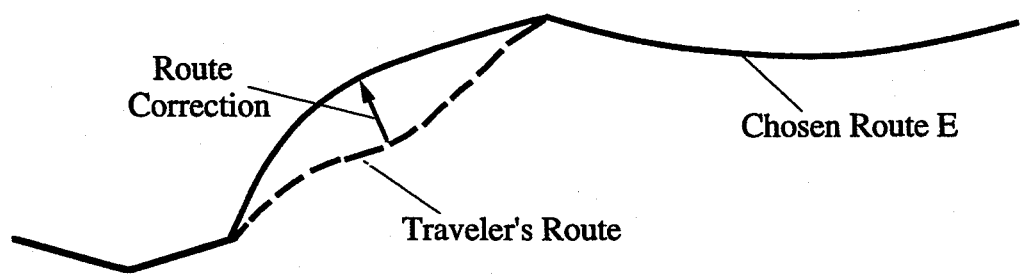
FIG. 3 illustrates deviation from a chosen route of a traveler's actual route, which is correctable according to the invention.

Optionally, the traveler can be advised, continually or intermittently, when the traveler's actual route followed differs significantly from the chosen route entered using the map 11. The traveler can be advised audibly by a voice synthesizer or similar means of the change of course (distance and direction) required to bring the traveler approximately back to the chosen route (e.g., by an audibly perceptible message, such as "Move left by 15 meters"). Alternatively, the traveler can be advised by visual means, such as use of a blinking cursor or other visually distinguishable indicia, of the distance and direction of movement required to bring the traveler approximately back onto the chosen route, as illustrated in FIG. 3. After completion of all or a portion of the chosen route E, the actual route traveled may be compared visually or with the chosen route or analyzed, using a map display or analytical instrument that determines average deviation distance or other appropriate quantitative or statistical parameters.

In the preferred embodiment, this end-of-the-segment information and/or route correction information is provided audibly so that a traveler who is visually impaired or otherwise occupied with other visual details can receive and act upon such information. The microprocessor 21, SATPS antenna 30, SATPS signal receiver/processor 31, voice synthesizer 35 and visual display 37 are contained in a portable navigation unit or other appropriately packaged system 39 that is carded by the traveler.

A transmitter or transceiver 41 and associate antenna 43 is optionally included with the SATPS receiver/processor 31, to periodically report on the traveler's present location, using a modem, a cellular telephone, an fm sub-carrier module or another suitable telecommunication platform. Optionally, the SATPS receiver/processor 31 can also determine and record the time at which the traveler passes one or more specified points on the route E, such as one or more of the decision points. Other relevant information for the local area, such as detours required, route impassibility due to avalanche or other similar occurrences, traffic advisories, or inclement weather expected along the route, can be downloaded into the SPS receiver/processor 31 carried by the traveler initially or on route, in order to advise the traveler of optional routes that should be considered.

The traveler is thus prompted just before reaching and/or at the time the traveler reaches each decision point in the route E, or whenever a significant deviation from the chosen route is sensed, by an aurally perceptible voice and/or visually perceptible display. The traveler may, alternatively, trace two or more alternative routes front location C to location D, having priorities 1, 2, 3, . . . If some portion of the priority 1 route is found to be impassible or to contain a detour or other route deviation, the traveler can choose a lower priority route that can be followed for a portion of, or the remainder of, the route to the destination.

Accuracy of the SATPS determined location of the SATPS antenna carried by the traveler can be improved by use of SATPS differential position information. One method of SPS signal differential position determination is disclosed by Allison in U.S. Pat. No. 5,148,179, incorporated by reference herein. Differential positioning is best performed by use of an SPS reference receiver located at a known location (either stationary of moving) in or near the region R, with the SATPS-determined reference receiver location being communicated to an SATPS roving receiver carried by the traveler.

This invention is useful for travelers who are visually impaired or visually occupied with other tasks and is useful for mid-trip route changes made necessary by changed circumstances along the route. The route to be taken is not limited to roads shown on a road map and may include paths for which no road map details are available, such as a route chosen through a wilderness or unmarked region.

A Satellite Positioning System (SATPS) is a system of satellite signal transmitters, with receivers located on the Earth's surface or adjacent to the Earth's surface, that transmits information from which an observer's present location and/or the time of observation can be determined. Two operational systems, each of which qualifies as an SATPS, are the Global Positioning System (GPS) and the Global Orbiting Navigational Satellite System (GLONASS).

The Global Positioning System (GPS) is part of a satellite-based navigation system developed by the U.S. Defense Department under its NAVSTAR program. A fully operational GPS includes up to 24 satellites approximately uniformly dispersed around six circular orbits with four satellites each, the orbits being inclined at an angle of 55° relative to the equator and being separated from each other by multiples of 60° longitude. The orbits have radii of 26,560 kilometers and are approximately circular. The orbits are non-geosynchronous, with 0.5 sidereal day (11.967 hours) orbital time intervals, so that the satellite orbits precess with time relative to the Earth below. Theoretically, three or more GPS satellites will be visible from most points on the Earth's surface, and visual access to two or more such satellites can be used to determine an observer's position anywhere on the Earth's surface, 24 hours per day. Each satellite carries a cesium or rubidium atomic clock to provide timing information for the signals transmitted by the satellites. Internal clock correction is provided for each satellite clock.

Each GPS satellite transmits two L-band carrier signals: an L1 signal having a frequency $f1 = 1575.42$ MHz and an L2 signal having a frequency $f2 = 1227.6$ MHz. These two frequencies are integral multiples $f1 = 1500\ f0$ and $f2 = 1200\ f0$ of a base frequency $f0 = 1.023$ MHz. The L1 and L2 signals from each satellite are binary phase shift key (BPSK) modulated by predetermined pseudo random noise (PRN) codes that are different for each of the GPS satellites deployed. One motivation for use of two carrier signals L1 and L2 is to allow partial compensation for propagation delay of such a signal through the ionosphere, which delay varies approximately as the inverse square of signal frequency f (delay $\propto f^{-2}$). This phenomenon is discussed by MacDoran in U.S. Pat. No. 4,463,357, which discussion is incorporated by reference herein. When transit time delay through the ionosphere is determined, a phase delay associated with a given carrier signal can be determined.

Use of the PRN codes allows use of a plurality of GPS satellite signals for determining an observer's position and for providing navigation information. A signal transmitted by a particular GPS signal is selected by generating and matching, or correlating, the PRN code for that particular satellite. All PRN codes are known and are stored in GPS satellite signal receivers carried by ground observers. A first PRN code for each GPS satellite, sometimes referred to as a precision code or P-code, is a relatively long, fine-grained code having an associated clock rate of $10\ f0 = 10.23$ MHz. A second PRN code for each GPS satellite, sometimes referred to as a clear/acquisition code or C/A code, is intended to facilitate rapid satellite signal acquisition and is a relatively short, coarser-grained code having a clock rate of $f0 = 1.023$ MHz. The C/A code for any GPS satellite has a length of 1023 chips or time increments before this code repeats. The P-code for any GPS satellite has a length of precisely one week (7.000 days) before this code repeats. The GPS satellite bit stream includes information on the ephemeris of each GPS satellite, parameters identifying the particular GPS satellite, and corrections for ionospheric signal propagation delays. A useful discussion of the GPS and techniques for obtaining position information from the satellite signals is found in *The Navstar Global Positioning System*, Tom Logsdon, Van Nostrand Reinhold, New York 1992, incorporated herein by reference.

A second configuration for global positioning is the Global Orbiting Navigation Satellite System (GLONASS), placed in orbit by the former Soviet Union. GLONASS also uses 24 satellites, distributed approximately uniformly in three orbital planes of eight satellites each. Each orbital plane has a nominal inclination of 64.8° relative to the equator, and the three orbital planes are separated from each other by multiples of 120° longitude. The GLONASS circular orbits have radii of about 25,510 kilometers, and a satellite period of revolution of 8/17 of a sidereal day (11.26 hours). A GLONASS satellite and a GPS satellite will thus complete 17 and 16 revolutions, respectively, around the Earth every 8 days. The GLONASS system uses two carder signals L1 and L2 with frequencies of $f1=(1.602+9k/16)$ MHz and $f2=(1.246+7k/16)$ MHz, where k $(=0, 1, 2, \ldots, 23)$ is the channel or satellite number. Because the channel frequencies are distinguishable from each other, the P-code, and also the C/A code, is the same for each satellite.

Reference to a Satellite Positioning System or SATPS herein refers to a Global Positioning System, to a Global Orbiting Navigation Satellite System, and to any other compatible satellite-based system that provides information by which an observer's position and the time of observation can be determined.

I claim:

1. A method for indicating, and allowing a traveler to follow, a chosen route from an origin point to a destination point on or near the Earth's surface, where the route does not coincide with part of an established system of roads, the method comprising the steps of:
providing a map of a region R, having approximately uniform scaling, the map having two spaced apart location indicator points whose location coordinates are known;
selecting a chosen route from a selected origin to a selected destination on the map;
entering and storing location information on the indicator points in the memory of a microprocessor that contains information on the region R;
entering and storing information on the chosen route in the memory as a sequence of location coordinates of two or more connected route segments, each having at least two endpoints, in the microprocessor, where at least one of the route segments is not part of a segment of a surveyed road;
providing for the traveler an SATPS antenna and receiver/processor, connected to the microprocessor, to receive and analyze SATPS signals from two or more SATPS satellites and to determine the present location of the SATPS antenna;
providing information on the present location of the SATPS antenna to the microprocessor;
comparing the present location of the SATPS antenna with the location coordinates of an adjacent one of said connected route segments; and
when the present location of the SATPS antenna is not on said adjacent one of said route segments, advising the traveler if the present location of the SATPS antenna is beyond a selected distance d1 from a nearest point on said adjacent one route segment, and identifying the direction and the distance of the present antenna location relative to said nearest point on said one adjacent route segment, using error presentation means that is audibly perceptible or visually perceptible for advising the traveler.

2. The method of claim 1, further comprising the step of choosing said chosen route so that none of said route segments is part of any established road.

3. The method of claim 1, wherein said step of advising said traveler that said present location of said antenna is beyond said selected distance d1 from said nearest point on said one adjacent route segment comprises providing a visually perceptible map display of a region surrounding said present location of said antenna and including at least a portion of said one adjacent route segment that includes said nearest point.

4. The apparatus of claim 3, further comprising the step of displaying on said map a selected portion of said chosen route and a selected portion of the actual route followed by said traveler.

5. The method of claim 1, further comprising the step of:
when said present location of said antenna is within a specified distance d2 from a common endpoint of two consecutive members of said route segments, advising said traveler that said present location of said antenna is within the specified distance d2 of this common endpoint, using said error presentation means.

6. The method of claim 5, wherein said step of advising said traveler that said present location of said antenna is within said selected distance d1 of said common endpoint comprises providing a visually perceptible map display of a region surrounding said present location of said antenna and including said common endpoint.

7. The method of claim 6, further comprising the step of expanding the scale of said visually perceptible map display when said traveler is near said common endpoint, to display the region surrounding said present location of said antenna and said common endpoint in larger size.

8. The method of claim 1, further comprising the step of determining said antenna present location by use of differential position determination with said SATPS signals.

9. The method of claim 1, further comprising the steps of:
entering and storing information on at least one second route, from said origin to said destination, as a sequence of two or more connected route segments, each having at least two endpoints, in the microprocessor, where said second route is not identical with said chosen route but intersects said chosen route at at least one location other than at said origin and at said destination;
when a portion of said chosen route is determined to be impassible, advising said traveler of the impassibility of said portion of said chosen route; and
allowing said traveler to select said second route that avoids the impassible portion of said first chosen route.

10. The method of claim 1, wherein said step of entering and storing said location information on said indicator points comprises the steps of:
   providing a bar code containing said location information; and
   reading said location information contained in the bar code into said memory.

11. The method of claim 10, wherein said step of entering and storing information on said chosen route comprises the steps of:
   providing a second bar code containing supplemental information drawn front the class consisting of (1) survey data for said region R and (2) at least one recognizable landmark, located within said region R, and the location coordinates of said landmark; and
   reading said supplemental information contained in the second bar code into said memory.

12. The method of claim 1, wherein said step of entering and storing information on said chosen route comprises the steps of:
   providing an activatable stylus that is connected to said microprocessor, and whose location coordinates relative to said map indicator points are sensed by said microprocessor when the stylus is activated;
   activating the stylus and tracing said chosen mute on said map as said sequence of said connected route segments; and
   storing in said memory the location coordinates of the stylus relative to said map as the stylus traces said chosen route on said map.

13. The method of claim 1, wherein said step of entering and storing information on said chosen route comprises the steps of:
   selecting each of said route segments of said chosen route as a linear segment; and
   defining each of said route segments of said chosen route by said two consecutive endpoints of said route segment and by linear interpolation between said two consecutive endpoints.

14. The method of claim 1, further comprising the step of periodically transmitting said present location of said antenna to a central station that is spaced apart from said traveler, for tracking the movements of said antenna.

15. The method of claim 1, further comprising the step of causing said traveler to periodically receive information on the present status of said chosen route.

16. Apparatus to be carried by a traveler, for indicating, and allowing the traveler to follow, a chosen route, shown on a map of a selected region R, from a selected origin point to a selected destination point on or near the Earth's surface, where the chosen route does not coincide with part of an established system of roads, the apparatus comprising:
   a microprocessor having a memory;
   information entry means for entering into the memory information on said chosen route from said map, the chosen route being defined by a sequence of two or more connected route segments, each segment having at least two consecutive endpoints, where at least one of the route segments is not part of an established road, and for entering into the memory information on the scale of the map and the location coordinates of at least two spaced apart indicator points on the map;
   an SATPS signal antenna and received processor, connected to the microprocessor, oriented to receive SATPS signals from at least two SATPS satellites and to determine therefrom the present location of the antenna;
   information presentation means for advising the traveler, by an audibly perceptible or visually perceptible message, of the present location of the SATPS antenna: and
   location comparison means for receiving and comparing the present location of the SATPS antenna with an adjacent one of said route segments for said chosen route containing a point nearest to the SATPS antenna present location and, when the SATPS antenna present location is not on said one adjacent route segment containing said nearest point and is beyond a selected distance d1 from said nearest point, for advising the traveler of the distance and direction of the present location of the SATPS antenna relative to said nearest point, using the information presentation means.

17. The apparatus of claim 16, wherein none of said route segments is part of an established road.

18. The apparatus of claim 16, wherein said information presentation means provides a visually perceptible map display of a region surrounding said present location of said antenna that includes at least a portion of said route segment containing said nearest point.

19. The apparatus of claim 16, wherein said information presentation means audibly advises said traveler of said distance and said direction of said present location of said antenna relative to said nearest point.

20. The apparatus of claim 16, wherein said location comparison means advises said traveler when said present location of said antenna is within a selected distance d2 from a nearest endpoint of one of said route segments, using said information presentation means.

21. The apparatus of claim 20, wherein said information presentation means provides a visually perceptible map display of a region surrounding said present location of said antenna that includes at least a portion of said route segment containing said nearest endpoint.

22. The apparatus of claim 21, wherein said information presentation means increases the scale of said visual display when said present location of said antenna is within said distance d2 from said nearest endpoint, to display a region containing said present location of said antenna and said nearest endpoint in larger size.

23. The apparatus of claim 16, wherein said information entry means and said memory also receive and store information on a second route, from said origin point to said destination point, as a sequence of two or more connected route segments, each having at least two endpoints, where the second route is not identical with said chosen route but intersects said chosen route at at least one location other than said origin point and said destination point; and
   when a portion of said chosen route is determined to be impassible, said information presentation means advises said traveler of the impassibility of said portion of said chosen route, and said information entry means allows said traveler to select said second route that avoids the impassible portion of said chosen route.

24. The apparatus of claim 16, wherein said information, entry means comprises a bar code reader for reading information, contained on at least one bar code, on the scale of said map into said memory.

25. The apparatus of claim 24, wherein said bar code reader also reads into said microprocessor memory information in a second bar code containing supplemental information drawn from the class consisting of (1) survey data for said region R and (2) at least one recognizable landmark, located within said region R, and the location coordinates of said landmark.

26. The apparatus of claim 16, further comprising an activatable stylus that is connected to said microprocessor, and whose location coordinates relative to said map indicator points are sensed by said microprocessor when the stylus is activated, where the stylus is activated and used to trace said chosen route on said map as said sequence of said connected route segments, and said location coordinates of the stylus as the stylus traces said chosen route on said map are stored in said memory.

27. The method of claim 16, wherein, when each of said route segments of said chosen route is a linear segment, said location entry means defines each of said route segments of said chosen route by said two consecutive endpoints of said route segment and by linear interpolation between said two consecutive endpoints.

28. The apparatus of claim 16, further comprising a signal transmitter, connected to said SATPS receiver/processor, for allowing tracking of the movements of said traveler by periodically transmitting said present location of said antenna to a central station that is spaced apart from said antenna.

29. The apparatus of claim 16, further comprising a signal receiver, connected to said microprocessor, for allowing said traveler to receive information on the status of said chosen route as said traveler moves along said chosen route.

* * * * *